(12) United States Patent
Kang et al.

(10) Patent No.: US 7,852,535 B2
(45) Date of Patent: Dec. 14, 2010

(54) APPARATUS AND METHOD FOR CONVERTING COLOR DATA USING COLOR GAMUT EXTENSION

(75) Inventors: Byoung-ho Kang, Suwon-si (KR); Dae-won Kim, Daegu (KR); Heui-keun Cho, Seongnam-si (KR); Min-ki Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 11/328,142

(22) Filed: Jan. 10, 2006

(65) Prior Publication Data

US 2006/0170941 A1  Aug. 3, 2006

(30) Foreign Application Priority Data

Jan. 28, 2005   (KR) ...................... 10-2005-0008039

(51) Int. Cl.
*G03F 3/08* (2006.01)
(52) U.S. Cl. ................. 358/529; 358/1.9; 358/518; 358/519; 358/520; 358/515; 382/162; 382/167; 345/589; 345/600; 345/603; 345/604
(58) Field of Classification Search ................. 358/1.9, 358/518–519, 529; 382/167; 345/589–590, 345/604
See application file for complete search history.

(56) References Cited

U.S. PATENT DOCUMENTS 5,553,199 A * 9/1996 Spaulding et al. ............ 358/1.9

| | | | |
|---|---|---|---|
| 6,281,984 B1 * | 8/2001 | Decker et al. | 358/1.9 |
| 6,362,808 B1 * | 3/2002 | Edge et al. | 345/601 |
| 6,386,670 B1 * | 5/2002 | Huang et al. | 358/522 |
| 6,776,473 B2 * | 8/2004 | Huang et al. | 347/43 |
| 6,778,300 B1 * | 8/2004 | Kohler | 358/529 |
| 6,867,883 B1 * | 3/2005 | Cholewo et al. | 358/1.9 |
| 6,961,461 B2 * | 11/2005 | MacKinnon et al. | 382/164 |
| 2003/0081831 A1 * | 5/2003 | Fukao et al. | 382/167 |
| 2004/0113978 A1 * | 6/2004 | Huang et al. | 347/43 |
| 2004/0136014 A1 * | 7/2004 | Maltz | 358/1.9 |
| 2004/0223173 A1 * | 11/2004 | Arai | 358/1.9 |
| 2005/0276474 A1 * | 12/2005 | Um et al. | 382/167 |
| 2005/0281459 A1 * | 12/2005 | Bala et al. | 382/162 |
| 2006/0072130 A1 * | 4/2006 | DeBaer | 358/1.9 |

FOREIGN PATENT DOCUMENTS

EP    1100256 A1  *  5/2001

OTHER PUBLICATIONS

Kang et al., "Methods of colour gamut extension algorithm development using experimental data", TENCON 99, Sep. 15-17, 1999, vol. 1, pp. 352-355.*

* cited by examiner

*Primary Examiner*—Benny Q Tieu
*Assistant Examiner*—Javier J Ramos
(74) *Attorney, Agent, or Firm*—Sughrue Mion, PLLC

(57) ABSTRACT

An apparatus and method for converting color data are provided. The method includes generating a CMYK color gamut extended from a CMY color gamut that consists of a cyan (C) colorant, a magenta (M) colorant, and a yellow (Y) colorant, by use of the CMY color gamut and a black (K) colorant; mapping input colors using the generated CMYK color gamut; converting color data of the mapped input colors to CMY data; and converting the CMY data to CMYK data. Accordingly, natural representation and printing of low-lightness colors and high-saturation colors can be attained.

19 Claims, 7 Drawing Sheets

APPARATUS AND METHOD FOR CONVERTING COLOR DATA USING COLOR GAMUT EXTENSION

CROSS-REFERENCE TO RELATED APPLICATIONS

This application claims priority from Korean Patent Application No. 10-2005-0008039 filed on Jan. 28, 2005 in the Korean Intellectual Property Office, the entire disclosure of which is incorporated herein by reference.

BACKGROUND OF THE INVENTION

1. Field of the Invention

The present invention relates to an apparatus and method for converting color data using a color gamut extension, and more particularly, to mapping input colors and converting color data as to the mapped colors to CMYK data by use of a CMYK color gamut that is extended from a CMY color gamut.

2. Description of the Related Art

Most of printers commercially available on the market use four colorants of a cyan (C) colorant, a magenta (M) colorant, a yellow (Y) colorant, and a black (K) colorant. The addition of the K colorant provides for color gamut extension and increased cost effectiveness.

Thus, an apparatus is required to convert color data of the input colors, such as RGB data, to CMYK data.

FIG. 1 is a block diagram of, a conventional apparatus for converting RGB data to CMYK data. As shown in FIG. 1, the apparatus includes a color mapper 10, a color data converter 20, and a K substitution part 30.

The color mapper 10 converts input colors, as RGB data, to CIE L*a*b color space data in a CMY color gamut. The color data converter 20 converts the color data CIE L*a*b, which is mapped at the color mapper 10, to CMY data. The K substitution part 30 converts the CMY data that is output from the color data converter 20, to the CMYK data. As a result, the CMYK data is output from the K substitution part 30.

The final color data output from the apparatus for converting the color data is CMYK data, but the CMY color gamut is used for the color mapping at the color mapper 10. As the K substitution part 30 converts the CMY data to the CMYK data, the ratio of the C, M, and Y colorants for the input color is decreased while the K colorant is added at a proper ratio. Thus, the CMY data can be converted to the CMYK data.

However, the above conventional color mapping and color substitution causes unnatural color reproduction and printing with respect to low-lightness colors and high-saturation colors.

SUMMARY OF THE INVENTION

The present invention has been provided to solve the above-mentioned and other problems and disadvantages occurring in the conventional arrangement, and an aspect of the present invention provides an apparatus and method for converting color data, which maps input colors and converts color data as to the mapped input colors to CMYK data in a CMYK color gamut extended from a CMY color gamut so as to produce more natural reproduction of low-lightness colors and high-saturation colors.

The above and other aspects of the present invention can be achieved by providing a method for converting color data which includes generating a CMYK color gamut which is extended from a CMY color gamut that consists of a cyan (C) colorant, a magenta (M) colorant, and a yellow (Y) colorant, by use of the CMY color gamut and a black (K) colorant; mapping input colors using the CMYK color gamut which is generated; converting color data of the input colors which are mapped to CMY data; and converting the CMY data which is converted from the color data of the input colors to CMYK data.

Generating the CMYK color gamut may include generating an extended color gamut by decreasing a lightness with respect to a lowest lightness point in the CMY color gamut; determining whether the extended color gamut can be formed with the C colorant, the M colorant, the Y colorant, and the K colorant; and determining the extended color gamut to be the CMYK color gamut if the extended color gamut can be formed with the C, M, Y, and K colorants.

The generating the extended color gamut may generate the extended color gamut by decreasing the lightness with respect to a lowest lightness point in the CMY color gamut and increasing a saturation range of the CMY color gamut.

A ratio of the K colorant may be determined based on a relevant lightness in the determining whether the extended color gamut can be formed.

In the determining whether the extended color gamut can be formed, the ratio of the K colorant may be determined based on the following equation:

$$\text{ratio of } K \text{ colorant} = \left( \frac{\text{second reference lightness}(L_2) - L}{\text{second reference lightness}(L_2) - \text{first reference lightness}(L_1)} \right)^n$$

where L is the relevant lightness.

The converting the CMY data which is converted from the color data to CMYK data may convert the CMY data to the CMYK data by use of one of the CMYK color gamut generated in the generating a CMYK color gamut which is extended from a CMY color gamut.

In accordance with another aspect of the present invention, an apparatus for converting color data includes a color gamut extension section which generates a CMYK color gamut which is extended from a CMY color gamut that consists of a cyan (C) colorant, a magenta (M) colorant, and a yellow (Y) colorant, by use of the CMY color gamut and a black (K) colorant; a color mapping section which maps input colors using the CMYK color gamut which is generated at the color gamut extension section; a color data converter which converts color data of the input colors which are mapped at the color mapping section, to CMY data; and a K substitution section which converts the CMY data which is output from the color data converter, to CMYK data.

The color gamut extension section may generate an extended color gamut by decreasing a lightness with respect to a lowest lightness point in the CMY color gamut, and determine the extended color gamut as the CMYK color gamut if the extended color gamut can be formed with the C, M, Y, and K colorants.

The color gamut extension section may generate the extended color gamut by decreasing the lightness with respect to a lowest lightness point in the CMY color gamut and increasing a saturation range of the CMY color gamut.

The color gamut extension section may determine a ratio of the K colorant based on a relevant lightness.

The color gamut extension section may determine the ratio of the K colorant based on the following equation:

$$\text{ratio of } K \text{ colorant} = \left( \frac{\text{second reference lightness}(L_2) - L}{\text{second reference lightness}(L_2) - \text{first reference lightness}(L_1)} \right)^n$$

where L is the relevant lightness.

The K substitution section may convert the CMY data to the CMYK data by use of the CMYK color gamut which is generated at the color gamut extension section.

BRIEF DESCRIPTION OF THE DRAWING FIGURES

The above and other aspects of the invention will become apparent and more readily appreciated from the following description of exemplary embodiments, taken in conjunction with the accompanying drawing figures of which:

DETAILED DESCRIPTION OF THE EXEMPLARY EMBODIMENTS OF THE INVENTION

Figure 1:
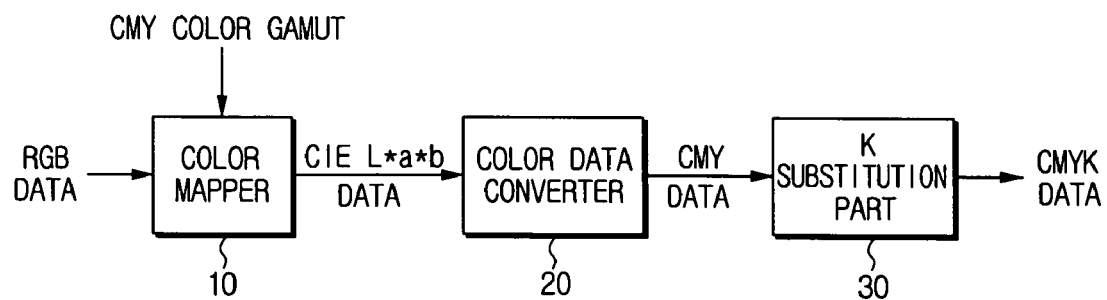
FIG. 1 is a block diagram of a conventional apparatus for converting RGB data to CMYK data.

Exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 2:
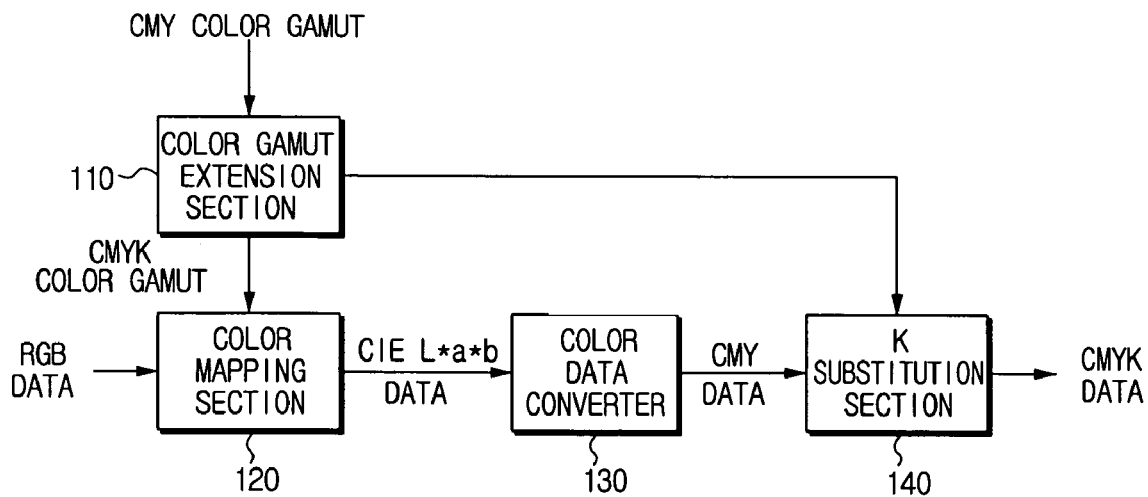
FIG. 2 is a block diagram of an apparatus for converting color data using a color gamut extension according to an exemplary embodiment of the present invention.

FIG. 2 is a block diagram of an apparatus for converting color data using a color gamut extension according to an exemplary embodiment of the present invention. The apparatus for converting the color data performs color mapping on input colors in a CMYK color gamut that is extended from a CMY color gamut. Next, the apparatus converts color data of the mapped input colors to CMYK data.

Referring to FIG. 2, the apparatus includes a color gamut extension section 110, a color mapping section 120, a color data converter 130, and a K substitution section 140.

The color gamut extension section 110 extends a CMY color gamut, which consists of a C colorant, an M colorant, and a Y colorant, by use of C, M, Y and K colorants. That is, the color gamut extension section 110 generates a CMYK color gamut that is extended from the CMY color gamut. The CMYK color gamut generation by extending the CMY color gamut at the color gamut extension section 110 will be explained in detail later.

The color mapping section 120 maps the input colors in the CMYK color gamut that is generated at the color gamut extension section 110. In particular, the color mapping section 120 converts RGB data, as the input color data, to CIE L*a*b color space data by use of the CMYK color gamut.

The color data converter 130 converts the CIE L*a*b data to CMY data.

The K substitution section 140 converts the CMY data, which is fed from the color data converter 130, to CMYK data. When converting the CMY data to the CMYK data, the K substitution section 140 uses the CMYK color gamut that is generated at the color gamut extension section 110 or a substantially equivalent color gamut.

Figure 3:
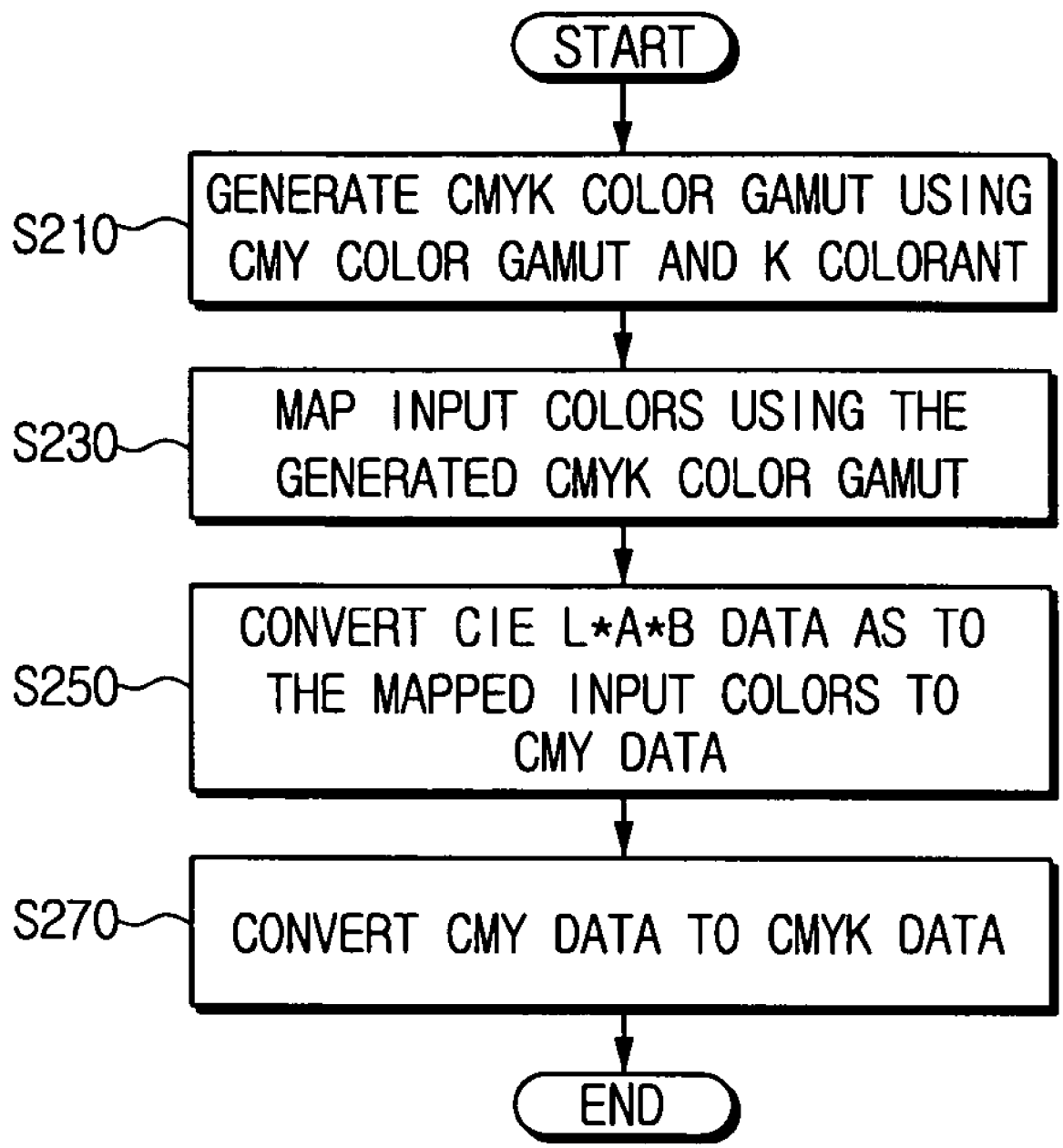
FIG. 3 is a flowchart outlining a method for converting color data using a color gamut extension according to an exemplary embodiment of the present invention.

Hereafter, the following description describes how the apparatus for converting the color data converts the color data using the color gamut extension with reference to FIG. 3. FIG. 3 is a flowchart outlining a method for converting color data using the color gamut extension according to an exemplary embodiment of the present invention.

Referring now to FIG. 3, the color gamut extension section 110 generates the CMYK color gamut by use of the CMY color gamut and K colorant (S210). The CMY color gamut consists of a C colorant, an M colorant, and a Y colorant. The CMYK color gamut is extended from the CMY color gamut by the addition of a K colorant.

Figure 4:
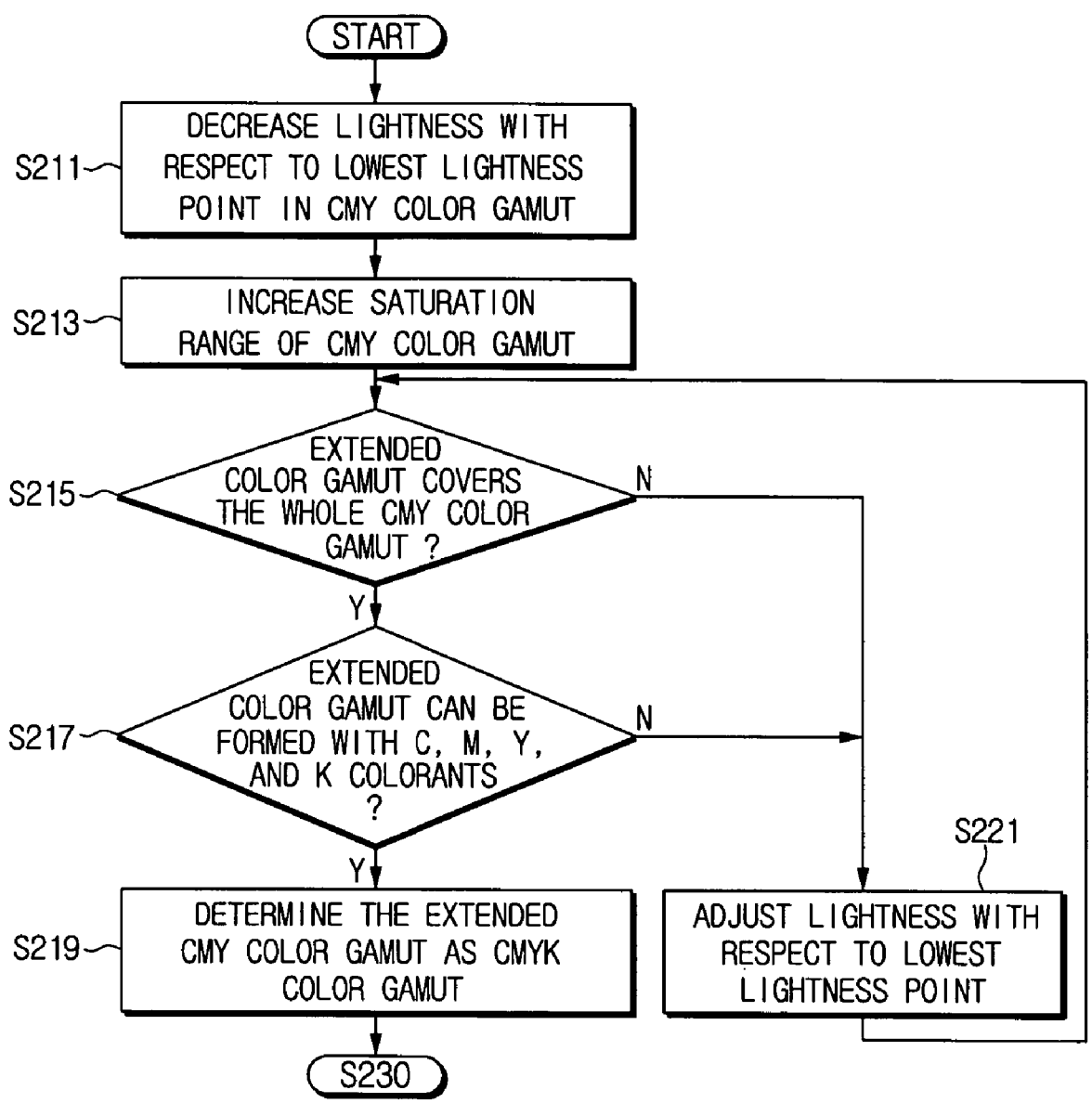
FIG. 4 is a flowchart explaining in detail the generation of the CMYK color gamut of FIG. 3.

The generation of the CMYK color gamut (S210) is described below in reference to FIG. 4. FIG. 4 is a flowchart explaining in detail the generation of the CMYK color gamut in operation S210.

The color gamut extension section 110 reduces a lightness with respect to a lowest lightness point in the CMY color gamut (S211), and increases a saturation range of the CMY color gamut in a certain direction (S213). As a result, an "extended color gamut" can be generated from the CMY color gamut.

Figure 5A:
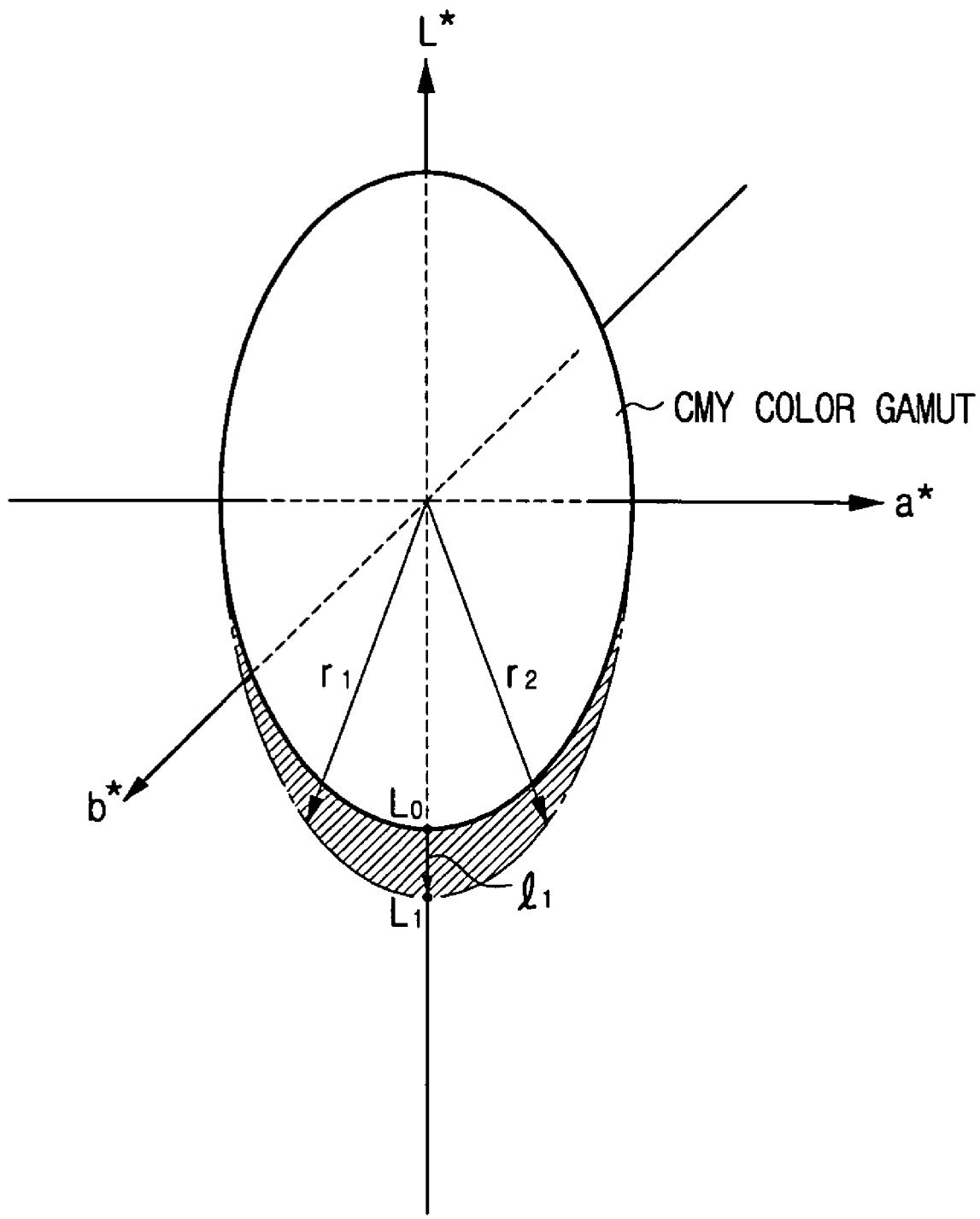
FIG. 5A through FIG. 5C are diagrams depicting the generation of the CMYK color gamut.

FIG. 5A graphically represents the generation of the extended color gamut from the conventional CMY color gamut in operations S211 and S213. In FIG. 5A, it can be seen that the lightness $L_0$ with respect to the lowest lightness point in the CMY color gamut is decreased to a lower lightness $L_1$ in operation S211, and that saturation range of the CMY color gamut is increased in a certain direction, such as $r_1$ direction or $r_2$ direction, in operation S213.

Figure 5B:
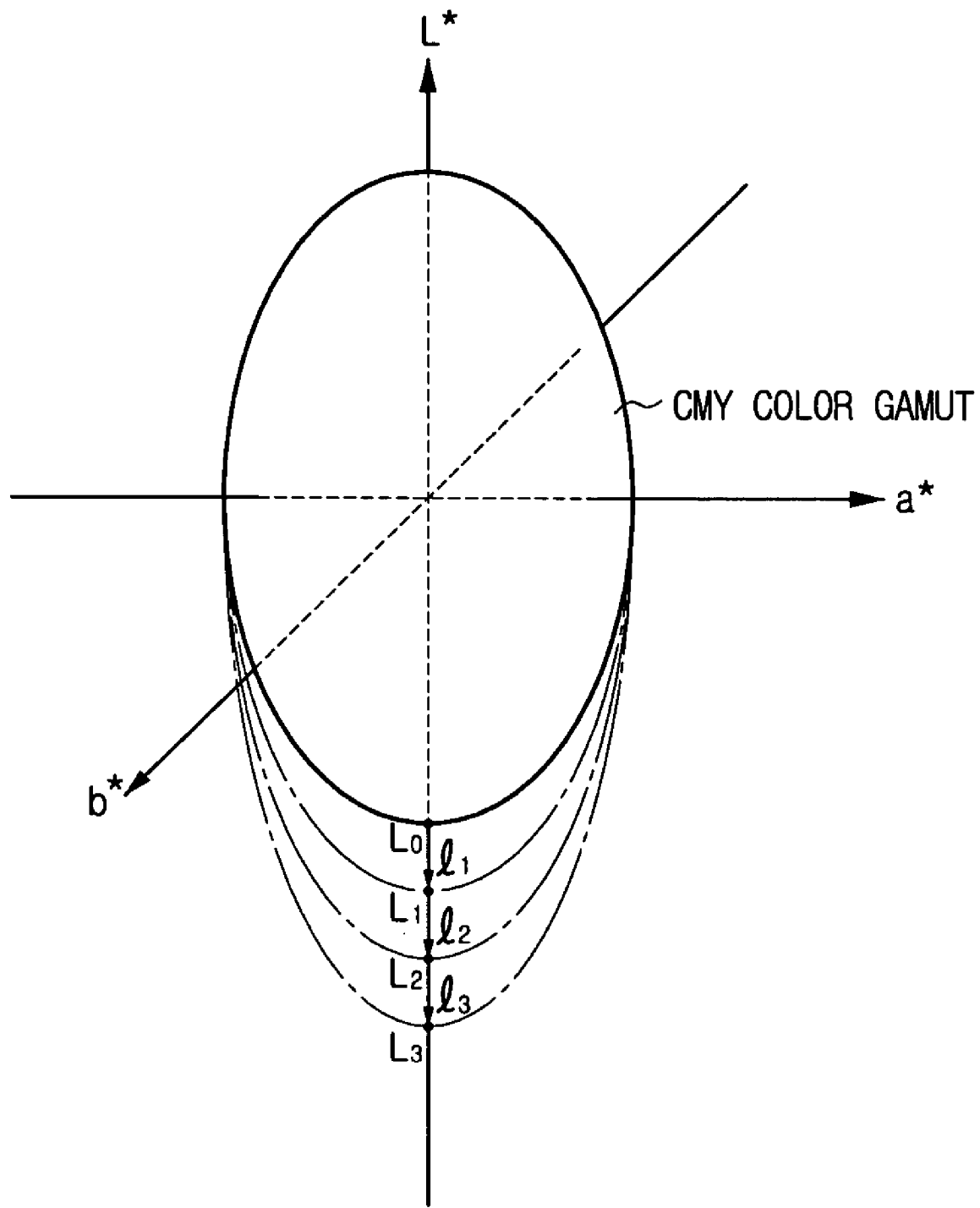

The operations S211 and S213 may be executed step by step. In other words, the lightness decrease with respect to the lowest lightness point and the saturation increase in the CMY color gamut can be carried out by predefined limits, as shown in FIG. 5B. Referring to FIG. 5B, as the lightness with respect to the lowest lightness point is decreased to $L_1$, $L_2$, and $L_3$ in sequence (i.e., the lowest lightness point is shifted down along $l_1$, $l_2$, and $l_3$ in sequence and the saturation range is increased at the same time) the color gamut can be extended gradually.

Next, the color gamut extension section 110 determines whether the extended color gamut covers the whole conventional CMY color gamut (S215). This determination is made in consideration of the decrease of the saturation range occurring when the lightness is excessively reduced with respect to the lowest lightness point.

Figure 5C:
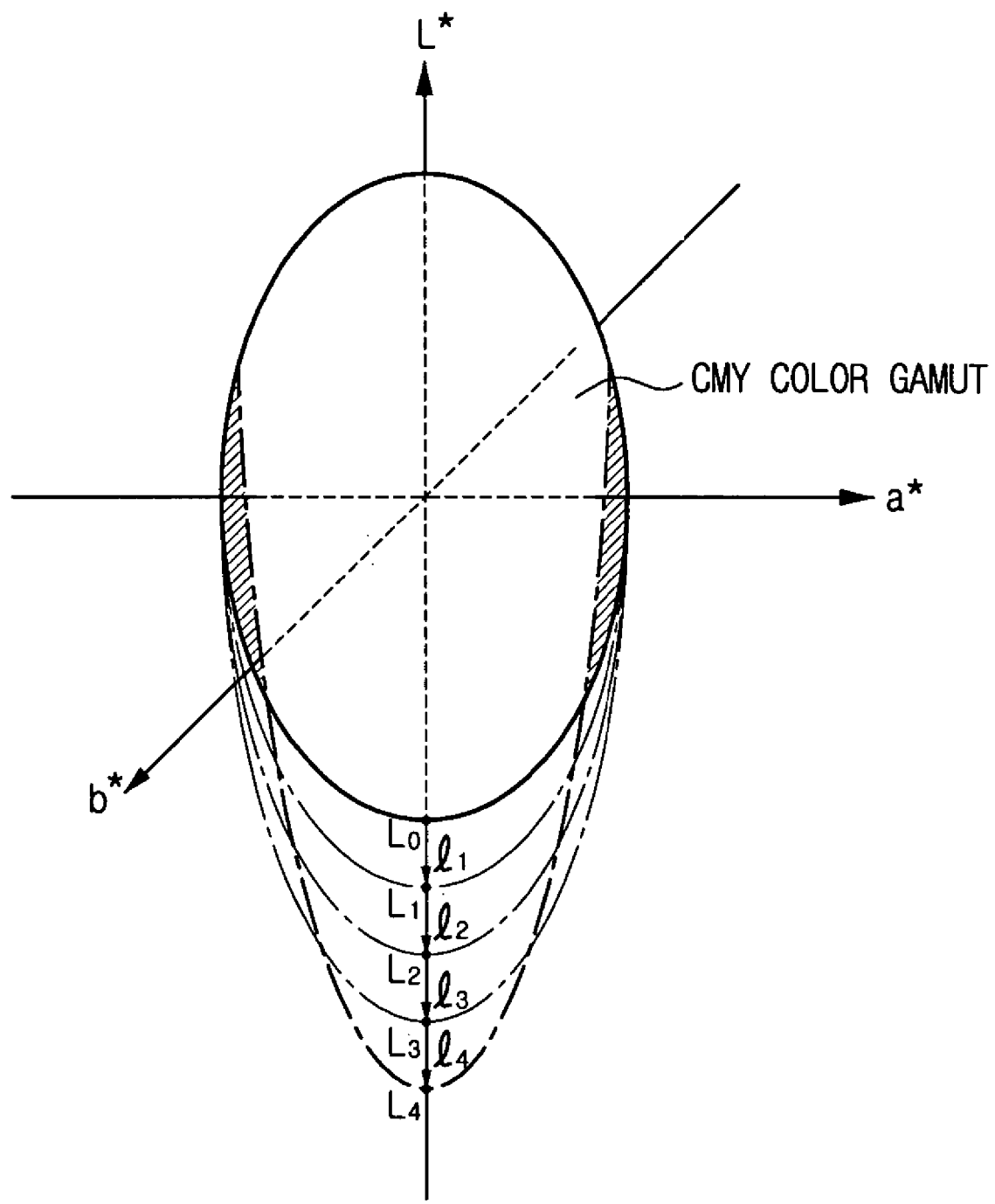

FIG. 5C shows a case when the extended color gamut does not cover the whole CMY color gamut due to the excessively decrementing the lightness. As shown in FIG. 5C, when the lightness is decreased to $L_4$ with respect to the lowest lightness point, the extended color gamut cannot cover the shaded portion of the conventional CMY color gamut. Thus, the extended color gamut is incapable of wholly covering the conventional CMY color gamut.

Such a phenomenon is disadvantageous to the color gamut extension. To prevent this, operation S215 is performed.

When the determination is made that the extended color gamut does not cover the whole CMY color gamut (S215), the color gamut extension section 110 adjusts the lightness with respect to the lowest lightness point (S221). Referring back to FIG. 5C, the operation S221 corresponds to the adjustment of the lightness from $L_4$ to $L_3$ with respect to the lowest lightness point. Next, the color gamut extension section 110 returns to operation S215.

Conversely, when the extended color gamut covers the whole CMY color gamut according to the determination in operation S215, the color gamut extension section 110 determines whether the extended color gamut can be formed by combinations of the C colorant, the M colorant, the Y colorant, and the K colorant (S217).

The ratio of the K colorant depends on a relevant lightness L in accordance with Equation 1.

$$\text{ratio of } K \text{ colorant} = \left( \frac{\text{second reference lightness}(L_2) - L}{\text{second reference lightness}(L_2) - \text{first reference lightness}(L_1)} \right)^n \quad \text{(Equation 1)}$$

Figure 6A:
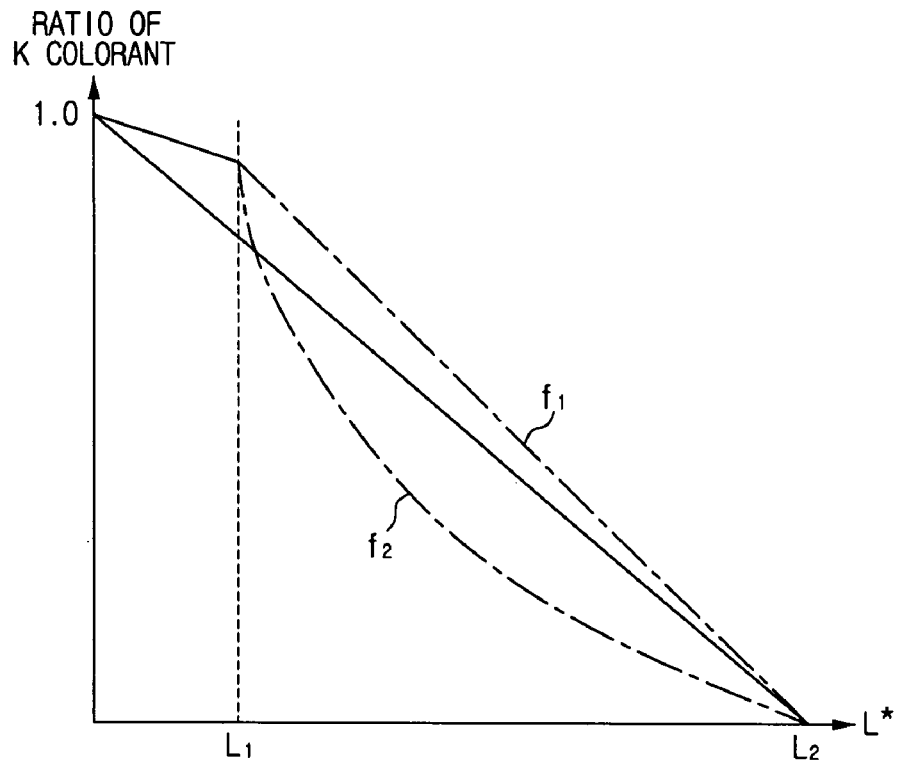
FIG. 6A and FIG. 6B are graphs showing the determination of the K colorant ratio.

FIG. 6A is a graph acquired based on Equation 1. In FIG. 6A, a graph indicated by $f_1$ is produced when n=1 in Equation 1, and a graph indicated by $f_2$ is produced when n=3 in Equation 1.

Figure 6B:
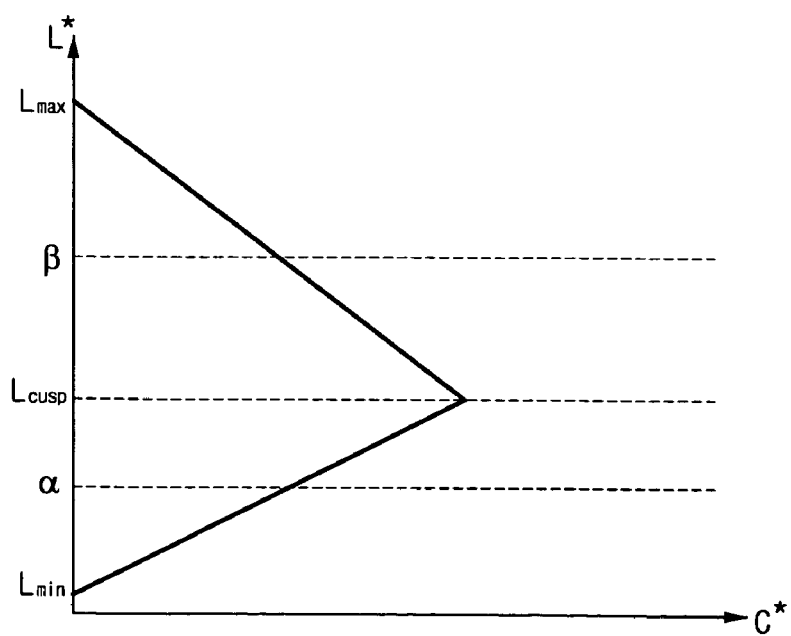

There are no restrictions on the first reference lightness $L_1$ and the second reference lightness $L_2$ in Equation 1. FIG. 6B shows appropriate reference lightness values by way of example. In FIG. 6B, $L_{max}$ is a maximum lightness point, $L_{min}$ is a minimum lightness point, and $L_{cusp}$ is a maximum saturation point. α is a middle point between $L_{min}$ and $L_{cusp}$, and β is a middle point between $L_{max}$ and $L_{cusp}$.

In an exemplary embodiment, α is set as the first reference lightness $L_1$ among the reference lightness values. In addition, one of $L_{max}$, β, and $L_{cusp}$ may be set as the second reference lightness $L_2$.

When the determination is made that the extended color gamut cannot be formed with the C, M, Y, and K colorants (S217), the color gamut extension section 110 adjusts the lightness with respect to the lowest lightness point (S221), and then returns to operation S215.

Conversely, when the determination is made that the extended color gamut can be formed with the C, M, Y, and K colorants (S217), the color gamut extension part 110 determines the extended color gamut as the CMYK color gamut (S219).

As such, the color gamut extension section 110 can generate the CMYK color gamut extended from the CMY color gamut. In the following, descriptions are provided starting from operation S230 with reference to FIG. 2.

Subsequent to operation S210, the color mapping section 120 performs color mapping on the input colors by use of the CMYK color gamut generated in operation S210 (S230). Specifically, the color mapping section 120 converts the RGB data of the input colors to the CIE L*a*b data using the CMYK color gamut.

The color data converter 130 converts the CIE L*a*b data of the converted RGB data, which are mapped in operation S230, to CMY data (S250).

Next, the K substitution section 140 converts the CMY data, which is output from the color data converter 130, to CMYK data (S270). In the conversion of the CMY data to the CMYK data, the K substitution section 140 utilizes the CMYK color gamut that is generated in operation S210 or a substantially equivalent color gamut.

Therefore, the CMYK data is output from the K substitution section 140.

As set forth above, the CMYK color gamut, which is extended from the CMY color gamut, is used to convert color data of the mapped input colors to CMYK data. Hence, it is possible to attain natural representation and printing of low-lightness colors and high-saturation colors.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for converting color data, the method comprising:
   generating a CMYK color gamut which is extended from a CMY color gamut that consists of a cyan (C) colorant, a magenta (M) colorant, and a yellow (Y) colorant, by use of the CMY color gamut and a black (K) colorant by decreasing a lightness with respect to a lowest lightness point in the CMY color gamut and increasing a saturation range of the CMY color gamut sequentially, in steps, until the extended color gamut no longer covers the CMY color gamut;
   mapping input red, green, blue colors using the CMYK color gamut which is generated;
   converting color data of the input colors which are mapped to CMY data; and
   converting the CMY data which is converted from the color data of the input colors to CMYK data,
   wherein at least one of the generating the CMYK color gamut, the mapping the input red, green, blue colors, the converting the color data, and the converting the CMY data is performed by a processing device.

2. The method of claim 1, wherein the generating the CMYK color gamut comprises:
   determining whether the extended color gamut can be formed with the C colorant, the M colorant, the Y colorant, and the K colorant; and
   determining the extended color gamut to be the CMYK color gamut if the extended color gamut can be formed with the C, M, Y, and K colorants.

3. The method of claim 2, wherein a ratio of the K colorant is determined based on a relevant lightness in the determining whether the extended color gamut can be formed.

4. The method of claim 3, wherein, in the determining whether the extended color gamut can be formed, the ratio of the K colorant is determined based on the following equation:

$$\text{ratio of } K \text{ colorant} = \left( \frac{\text{second reference lightness}(L_2) - L}{\text{second reference lightness}(L_2) - \text{first reference lightness}(L_1)} \right)^n$$

where L is the relevant lightness.

5. The method of claim 1, wherein the converting the CMY data which is converted from the color data to CMYK data converts the CMY data to the CMYK data by use of the CMYK color gamut generated in the generating a CMYK color gamut which is extended from a CMY color gamut.

6. The method of claim 1, wherein the generating comprising:
decreasing the lightness amount at each sequential step in equal amounts, according to a pre-defined value.

7. The method of claim 1, wherein the generating comprises:
decreasing the lightness and increasing the saturation range of the CMY color gamut sequentially, in steps, until the extended color gamut no longer comprises an entire CMY color gamut.

8. The method of claim 1, wherein the generating comprises:
decreasing the lightness and increasing the saturation range of the CMY color gamut sequentially, in steps, until the extended color gamut no longer comprises a saturation value of the CMY color gamut.

9. An apparatus for converting color data comprising:
a color gamut extension section which generates a CMYK color gamut which is extended from a CMY color gamut that consists of a cyan (C) colorant, a magenta (M) colorant, and a yellow (Y) colorant, by use of the CMY color gamut and a black (K) colorant by decreasing a lightness with respect to a lowest lightness point in the CMY color gamut and increasing a range of saturation values of the CMY color gamut sequentially, in steps, until the extended color gamut no longer covers the CMY color gamut;
a color mapping section which maps input red, green, blue colors using the CMYK color gamut which is generated at the color gamut extension section;
a color data converter which converts color data of the input colors which are mapped at the color mapping section to CMY data; and
a K substitution section which converts the CMY data which is output from the color data converter to CMYK data.

10. The apparatus of claim 9, wherein the color gamut extension section determines the extended color gamut as the CMYK color gamut if the extended color gamut can be formed with the C, M, Y, and K colorants.

11. The apparatus of claim 10, wherein the color gamut extension section determines a ratio of the K colorant based on a relevant lightness.

12. The apparatus of claim 11, wherein the color gamut extension section determines the ratio of the K colorant based on the following equation:

$$\text{ratio of } K \text{ colorant} = \left(\frac{\text{second reference lightness}(L_2) - L}{\text{second reference lightness}(L_2) - \text{first reference lightness}(L_1)}\right)^n$$

where L is the relevant lightness.

13. The apparatus of claim 9, wherein the K substitution section converts the CMY data to the CMYK data by use of the CMYK color gamut which is generated at the color gamut extension section.

14. The apparatus of claim 9, wherein the color gamut extension section generates the CMYK color gamut by:
decreasing, in steps, the lightness of the CMY color gamut to receive an intermediate CMYK color gamut lightness value;
at each step, comparing the range of saturation values of the extended color gamut to the range of saturation values of the CMY color gamut;
determining the minimum CMYK color gamut lightness value based on comparing; and
determining whether the extended color gamut can be formed with the C colorant, M colorant, Y colorant, and K colorant.

15. The apparatus of claim 14, wherein the color gamut extension section assigns to the minimum CMYK color gamut lightness value the intermediate CMYK color gamut lightness value determined at a previous step if the range of the saturation values of the extended CMY gamut is less than the range of the saturation values of the color gamut.

16. The apparatus of claim 14, wherein the color gamut extension section assigns to the minimum CMYK color gamut lightness value the intermediate CMYK color gamut lightness value determined at a previous step if the extended color gamut can not be formed with the C colorant, M colorant, Y colorant, and K colorant.

17. A method for converting color data, the method comprising:
generating a CMYK color gamut by extending a CMY color gamut which comprises a cyan (C) colorant, a magenta (M) colorant and a yellow (Y) colorant by use of the CMY color gamut and a black (K) colorant, comprising:
determining an intermediate CMYK color gamut lightness value by decreasing a lightness with respect to a lowest lightness point of the CMY color gamut and increasing a range of saturation values of the CMY color gamut sequentially, in steps,
at each step, comparing the range of saturation values of the extended color gamut to the range of saturation values of the CMY color gamut until the extended color gamut no longer covers the CMY color gamut,
determining a minimum CMYK color gamut lightness value based on the comparing, and
determining whether the extended color gamut can be formed with the C colorant, the M colorant, the Y colorant, and the K colorant;
mapping received red, green, blue colors using the generated CMYK color gamut into L*a*b* color space;
converting the mapped color data into CMY data; and
converting the CMY data to CMYK data,
wherein at least one of the generating the CMYK color gamut, the mapping the received red, green, blue colors, the converting the mapped color data, and the converting the CMY data is performed by a processing device.

18. The method of claim 17, wherein the determining the minimum CMYK color gamut lightness value comprises:
assigning to the minimum CMYK color gamut lightness value the intermediate CMYK color gamut lightness value determined at a previous step if the range of the saturation values of the extended gamut is less than the range of the saturation values of the CMY color gamut.

19. The method of claim 17, wherein the determining the minimum CMYK color gamut lightness value comprises:
assigning to the minimum CMYK color gamut lightness value the intermediate CMYK color gamut lightness value determined at a previous step if the extended color gamut can not be formed with the C colorant, M colorant, Y colorant, and K colorant.

* * * * *